United States Patent
Zou et al.

(10) Patent No.: US 7,782,843 B2
(45) Date of Patent: Aug. 24, 2010

(54) METHOD AND APPARATUS FOR SYNCHRONOUS CROSS-CONNECT SWITCHING IN OPTICAL TRANSPORT NETWORK

(75) Inventors: Shimin Zou, Shenzhen (CN); Limin Dong, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 12/209,619

(22) Filed: Sep. 12, 2008

(65) Prior Publication Data
US 2009/0074410 A1    Mar. 19, 2009

(30) Foreign Application Priority Data
Sep. 13, 2007   (CN) .................. 2007 1 0121741

(51) Int. Cl.
    H04L 12/50   (2006.01)
(52) U.S. Cl. ....................................... 370/360
(58) Field of Classification Search ............... 370/360, 370/353, 474, 503, 395, 537, 535, 299, 539, 370/355, 351, 466, 394, 400, 401, 392; 398/45, 398/47, 48, 51–54, 182, 58
See application file for complete search history.

(56) References Cited

U.S. PATENT DOCUMENTS

| | | | |
|---|---|---|---|
| 6,430,201 B1* | 8/2002 | Azizoglu et al. | 370/535 |
| 2003/0048813 A1* | 3/2003 | Lahav et al. | 370/537 |
| 2004/0062277 A1* | 4/2004 | Flavin et al. | 370/474 |
| 2004/0114638 A1* | 6/2004 | Matsuura et al. | 370/537 |
| 2004/0156325 A1* | 8/2004 | Perkins et al. | 370/299 |
| 2005/0078685 A1* | 4/2005 | MacLean et al. | 370/395.54 |
| 2005/0232310 A1* | 10/2005 | Cabrini et al. | 370/539 |
| 2007/0116061 A1* | 5/2007 | Meagher et al. | 370/503 |
| 2008/0095535 A1* | 4/2008 | Zou | 398/58 |
| 2008/0181203 A1* | 7/2008 | Jones et al. | 370/353 |
| 2009/0296719 A1* | 12/2009 | Maier et al. | 370/400 |

FOREIGN PATENT DOCUMENTS

| | | |
|---|---|---|
| EP | 1 280 373 A1 | 1/2003 |
| EP | 1 826 925 A1 | 8/2007 |
| WO | 2006/115736 A1 | 11/2006 |

OTHER PUBLICATIONS

European Search Report Issued in corresponding EPO Patent Application No. 08 16 4221; mailed Dec. 12, 2008.

* cited by examiner

*Primary Examiner*—Pankaj Kumar
*Assistant Examiner*—Prenell P Jones
(74) *Attorney, Agent, or Firm*—Brinks Hofer Gilson & Lione

(57) ABSTRACT

A method for synchronous cross-connect switching in optical transport network, the method includes: receiving optical channel transport unit (OTU) signals; mapping the OTU signals into interim switching units, wherein the interim switching units match bit rates of the received OTU signals; performing a synchronous cross-connect switching for the interim switching units; and demapping the interim switching units obtained after the synchronous cross-connect switching to obtain the OTU signals.

20 Claims, 4 Drawing Sheets

| Column | 1 — 7 | 8 — 14 | 15 | 16 | 17 — 3824 | 3825 — 4080 |
|---|---|---|---|---|---|---|
| Row 1 | FAS | OTU OH | | | | |
| 2 | ODU OH | | OPU OH | | OPU payload (3808 × 4 bytes) area | FEC |
| 3 | | | | | | |
| 4 | | | | | | |

METHOD AND APPARATUS FOR SYNCHRONOUS CROSS-CONNECT SWITCHING IN OPTICAL TRANSPORT NETWORK

This application claims the priority of Chinese application No. 200710121741.5 filed on Sep. 13, 2007, titled "method and apparatus for synchronous cross-connect switching in optical transport network", the entire content of which is incorporated herein by reference.

FIELD

The present embodiments relate to optical transport network (OTN), in particular, to a method and an apparatus for synchronous cross-connect switching in OTN.

BACKGROUND

As a core technology for next-generation optical transport networks, OTN involve technical specifications for the electrical layer and the optical layer and are becoming a mainstream technology used in backbone transport networks. An OTN provides the following features:

Powerful Operation, Administration and Maintenance (OAM);

Powerful Tandem Connection Monitor (TCM) capability and outband Forward Error Correction (FEC) capability; and Flexible grooming and management of large-capacity services.

In terms of cross-connect, at present the OTN system defines three levels of electrical layer signals: completely standardized Optical Channel Transport Unit k (OTUk), Optical Channel Data Unit-k (ODUk), and Optical Channel Payload Unit-k (OPUk). The OTN system defines three signal bit rate levels: 2.5 Gb/s (k=1), 10 Gb/s (k=2) and 40 Gb/s (k=3).

As shown in FIG. 1, an OTN frame is based on a 4×4080 byte structure (4 rows×4080 columns). The OTN frame structure comprises several areas, including a frame alignment area, an OTUk Overhead (OH) area, an ODUk OH area, an OPUk OH area, a payload area, and a Forward Error Correction (FEC) area:

The frame alignment area includes a Frame Alignment Sequence (FAS) and a Multi-frame Alignment Sequence (MFAS);

The OPUk OH area provides customer service mapping and adaptation management;

The ODUk OH area provides the management and supervision of OTN frames; and

The OTUk OH provides the supervision of transmission sections.

In order to guarantee the transparent transmission of customer data and synchronization & timing signals, OTN cross-connects based on three different bit rate levels of OTUk/ODUk signals. The switching of cross-connects based on ODUk connections is performed by a high-speed asynchronous cross-connect chip. The port bit rate of a high-speed large-capacity asynchronous electrical cross-connect chip available today, however, can usually reach 3.6 Gb/s only. This bit rate supports OTU1/ODU1 signal switching only but does not support hybrid switching of OTUk/ODUk signals of the three different bit rate levels. In addition, during asynchronous cross-connect, OTUk/ODUk signals are not 3R regenerated before passing an asynchronous cross-connect matrix. Therefore, the scale of interconnection of multiple cross-connect chips is restricted and the switching capacity of the OTN system cannot be effectively improved.

SUMMARY

A method for synchronous cross-connect switching in optical transport network, which includes: receiving optical channel transport unit (OTU) signals; mapping the OTU signals into interim switching units, wherein the interim switching units match bit rates of the received OTU signals; performing a synchronous cross-connect switching for the interim switching units; and demapping the interim switching units obtained after the synchronous cross-connect switching to obtain the OTU signals.

DETAILED DESCRIPTION

Figures 1, 2:
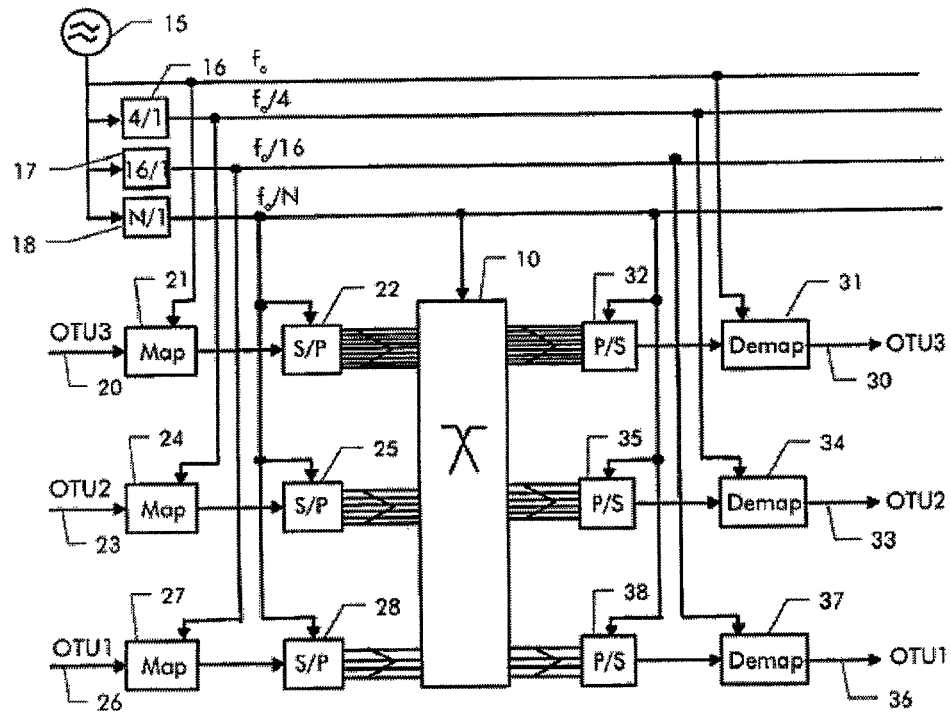
FIG. 1 shows a schematic structure of an OTN frame according to the related art.
FIG. 2 shows the principles of 699.84 MHz-based synchronous cross-connect switching according to the related art.

According to the present embodiments, Optical channel Transport Unit (OTU) signals or Optical Channel Data Unit (ODU) are mapped into interim switching units then are switched by a synchronous cross-connect matrix, so that synchronous hybrid cross-connect of OTN signals at various bit rate levels is performed. Therefore, the switching capacity of the system is expanded.

The OTN signals mentioned in the embodiments of the present invention include OTU signals and ODU signals. OTU signals are the signals with OTU structure, which include OTU1, OTU2, OTU1e/2e, OTU3 and future possible OTU signals defined by ITU-T, for example OTU0, OTU3+ and OTU4. ODU signals are the signals with ODU structure, which include ODU1, ODU2, ODU1e/2e, ODU3 and future possible ODU signals defined by ITU-T, for example, ODU0, ODU3e, ODU4e and possible ODU signal carried client signals. ODU signals could be obtained by terminating the OTU wrapper or adding ODU wrapper to client signal.

As an example, the bandwidth of interim switching unit which will be described in the embodiments of the present invention is 2.5 G b/s rate level. However, the embodiments of the present invention do not try to limit the specified bit rate level for interim switching unit, if the bit rate of the interim switching unit is adopted as other bit rate levels, such as 1.25 G b/s, it is still accordant to the range of the present invention.

The interim switching unit described in the embodiments of the present invention may include the basic interim switching unit and/or the combination of the basic interim switching units. The combination of the basic interim switching units is an interim switching unit which combines a number of basic interim switching units via pre-established protocol, and these basic interim switching units are combined in a fixed phase relation, and some additional overhead information should be added to indicate the fixed phase relation. The fixed phase relation includes the position of these basic interim switching units, optionally. It is also possible to include the sending order of these basic interim switching units. The basic interim switching unit is a signal with fixed structure. For example, in the embodiments of the present invention, it uses the standard ODU structure or modified ODU structure defined in G.709 as its structure, this kind of basic interim switching unit is called Optical channel data unit switching (ODUs). For combination of ODUs, it uses virtual concatenation and this kind of combination of ODUs is called "ODUs-Xv". However, the embodiments of the present invention does not try to limit the interim switching unit as ODUs or ODUs-Xv, it also includes other examples, such as timeslot, in corresponding, the combination of basic interim switching units is timeslot group. And it is easy for this case, so it will not be described in detail.

One embodiment provides a method for synchronous cross-connect switching in optical transport network, which includes:

Act 11: receiving the OTU signals in the OTN.

The OTU signals are OTU1 signals.

Act 12: mapping the OTU1 signal into the ODUs frames that match the bit rates of the OTU1 signals.

Act 13: performing a synchronous cross-connect switching for the ODUs frames using a synchronous cross-connect matrix.

Act 14: demapping the ODUs frames after the synchronous cross-connect switching and obtain the OTU1 signals.

The method may further includes the acts: removing outer encapsulation of the OTU1 signals to obtain optical channel data units; mapping the optical channel data units into the ODUs frames; demapping the ODUs frames after the synchronous cross-connect switching into the optical channel data units; and performing an outer encapsulation to the optical channel data units and obtaining the OTU1 signals.

In this embodiment, the mapping and the demapping may use the same methods described in the other embodiments. The acts of this embodiment may be implemented by one or more device or units.

Another embodiment provides a method for synchronous cross-connect switching in optical transport network, which includes:

Act 21: receiving OTU signals in the OTN;

The received OTU signals include at least one of OTU2 and OTU3 signals.

Act 22: mapping the OTU signals into ODUs-Xv frames that match the bit rates of the OTU signals.

The ODUs-Xv frames may be obtained by combining a plurality of ODUs frames according to a virtual concatenation rule, and the ODUs-Xv frames have higher capacity than the ODUs frames so that the ODUs-Xv frames can carry the OTU signals having higher bit rates, for example, OTU2 and OTU3 signals.

Act 23: dividing the ODUs-Xv frames into a plurality of groups having parallel ODUs frames.

Act 24: performing a synchronous cross-connect switching on the a plurality of groups having parallel ODUs frames.

For each group having parallel ODUs frames, the same switching path is applied during synchronous cross-connect switching. Bound switching is performed for the groups having parallel ODUs frames.

Act 25: assembling the parallel ODUs frames belonging to the same group after the synchronous cross-connect switching into the ODUs-Xv frames in act 2.

Act 26: demapping the ODUs-Xv frames to obtain the OTU signals in the act 1.

Similarly, in the method according, the act of removing outer encapsulation of the OTU signals and performing an outer encapsulation to the optical channel data units may also be included.

In this embodiment, the mapping and the demapping may use the same methods described in the other embodiments. The act of this embodiment may be implemented by one or more devices or units.

Figure 3:
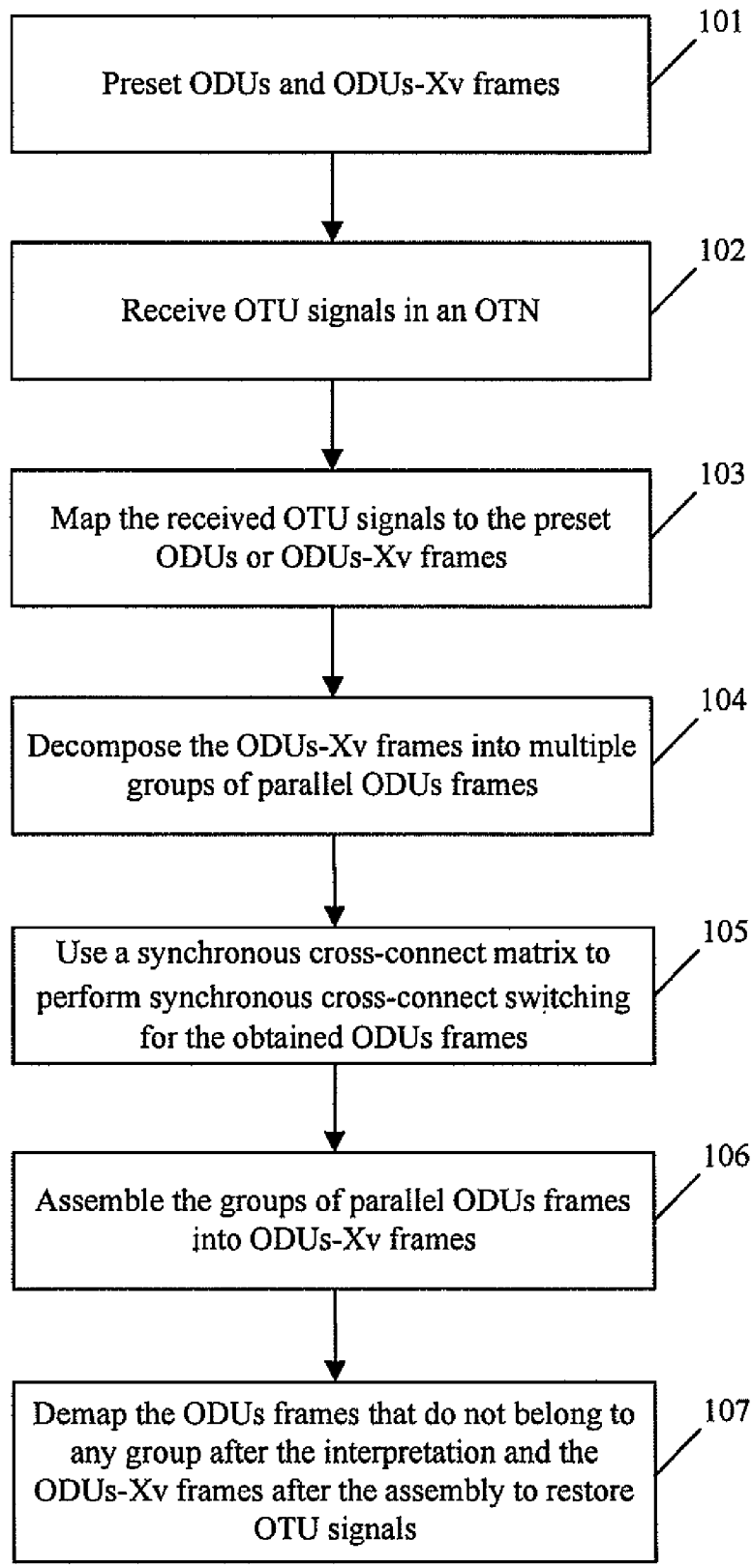
FIG. 3 shows a schematic flowchart of the method for synchronous cross-connect switching in optical transport networks according to one embodiment.

As shown in FIG. 3, one embodiment provides a method for synchronous cross-connect switch in optical transport networks. In the embodiment, a 2.5 Gb/s bit rate is taken as the switching granularity of ODUs frame and is taken as an example. The method includes the following acts.

In act 101, ODUs frames and ODUs virtual concatenation frames are preset.

The ODUs frames are used to carry OTU1 signal and the ODUs-Xv frames are used to carry OTUk signal having higher bit rate such as OTU2 or OTU3 signal.

The bit rate of the ODUs frame is slightly higher than the bit rate of OTU1 signal. Therefore, the ODUs frame is able to carry OTU1 signal. Similarly, the rate of the ODUs-Xv frame is higher than all the other OTUk signals except OTU1 signals (k>1), thus the ODUs-Xv frame is able to carry all the other OTUk signals.

Figure 4:
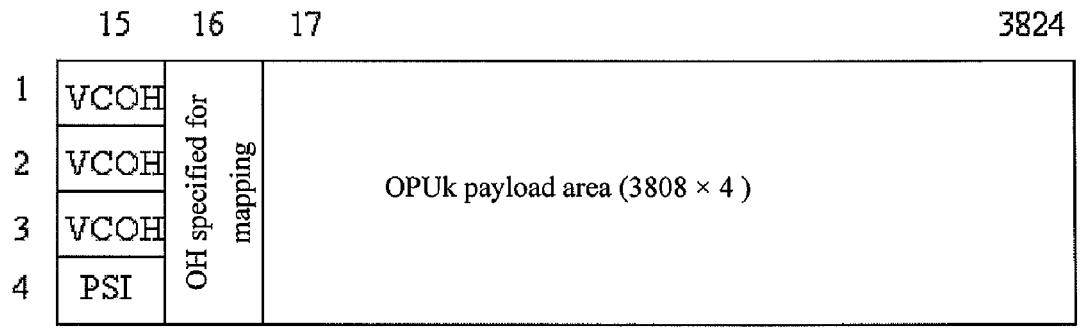
FIG. 4 shows a structure of an ODUs frame according to one embodiment
Figure 5:
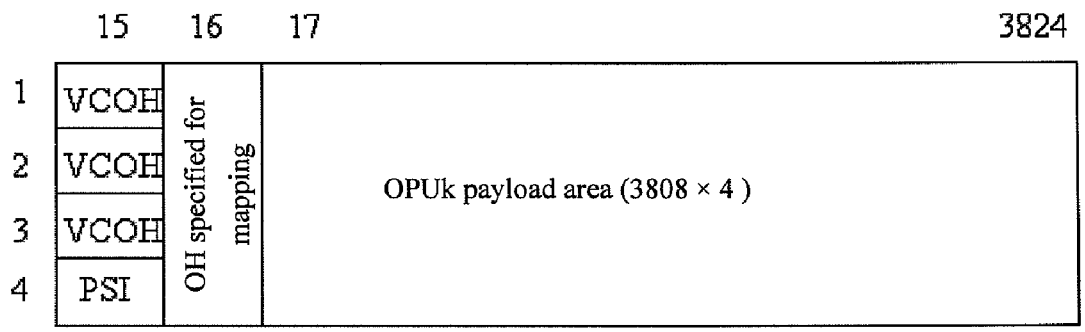
FIG. 5 shows the frame structure of the OPUk portion after an ODUs-Xv frame is split into X ODUs frames according to one embodiment.

To adapt OTUk signals of various bit rate levels, multiple ODUs frames may be further combined according to a virtual concatenation rule into an ODUs-Xv frame of higher capacity. For example, ODUs-Xv frame may be obtained after virtual concatenation, where X equals 4 or 16; ODUs-4v frame can carry OTU2 signals and ODUs-16v frame can carry OTU3 signals. The ODUs frame may adopt the standard ODU frame structure or a simplified ODU frame structure. As shown in FIG. 4, when the OTU OH excluding the FEC OH in a standard ODU frame is changed into a fixed padding field, a simplified ODU frame is obtained. The simplified ODU frame includes an FAS, a fixed padding field, an ODUk OH, an OPUk OH, and a payload area. The ODUk OH monitors the transport status of the ODUs frame. The ODUk OH may be further simplified to provide only an bit error detection function for the ODUs frame so as to reduce the complexity and cost of apparatus. FIG. 5 shows the frame structure of the OPUk portion after an ODUs-Xv frame is split into X ODUs frames. In this frame structure, several Virtual Concatenation Overhead (VCOH) bytes replace the reserved bytes in the OPUk OH. These VCOH bytes are used to identify the fixed phase relation among the ODUs frames, that is, the sequence of the ODUs frames. Because the delay of ODUs frames in a system can be controlled in the cross-connect switching, in order to simplify the complexity of the system, the delay between the ODUs frames may be controlled by control the wirings in a circuit board so that the multiframe MFI1/MFI2 function in the VCOH may be omitted and the cache is not needed to align the delay so as to save logical resources.

In act 102, OTU signals are received in an OTN.

The received OTU signals may be OTU1, OTU2, and/or OTU3 signals of various bit rate levels or at least one of them. The OTU signals of each bit rate level may further include multiple channels of OTUk signals. For example, one channel of OTU1 signals, two channels of OTU2 signals and five channels of OTU3 signals may be received. In addition, the received signals may also be OTU1e, OTU2e or other similar signals.

In act 103, the received OTU signals are mapped into the ODUs or ODUs-Xv frames that match the bit rate of the received OTU signals.

If the received OTU signals include OTU1, OTU2 and/or OTU3 signals, a mapping may be applied during bit rate adaptation: OTU1 (2.666057143 Gb/s). . . . >ODUs; OTU2 (10.709225316 Gb/s). . . . >ODUs-4v; OTU3 (43.018413559 Gb/s). . . . >ODUs-16v. For the ODUs frames that meet the above-mentioned carrying requirements, their bit rate is greater than or equal to 3824×43.018413559/(16×3808)= 2.699947699738 Gb/s. Therefore, 2.699947699738 GHz may be used as the reference frequency for synchronous cross-connect switching of the OTU1, OTU2 and/or OTU3 signals. The reference frequency offset is allowed to be ±20 ppm or a smaller range.

There are different ways to map the received OTU signals into ODUs or ODUs-Xv frames. For instance, an agnostic Constant Bit Rate (CBR) service mapping method, a byte padding method, or a bit padding method may be used to perform asynchronous mapping.

In ITU-T Recommendation G.709, an agnostic CBR mapping method is put forward to flexibly map customer signals. The agnostic CBR mapping method suites scenarios where multiple types of OTU signals such as OTU1, OTU2, OTU1e, OTU2e and OTU3 exist and hybrid switching is required. According to the agnostic CBR mapping method, Cn which is the number of customer signal bytes to be sent in the next frame is first mapped into a Cbyte field in the overhead area, and then the Cn customer signal bytes are mapped in a distributed way into ODUs or ODUs-Xv frames using a $\Sigma$-$\Delta$ algorithm.

Figure 6:
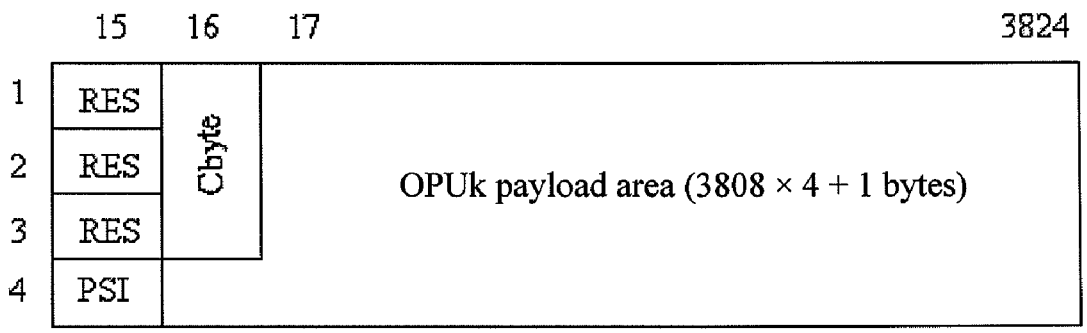
FIG. 6 shows the frame structure of the OPUk portion of an ODUs frame when using an agnostic Constant Bit Rate (CBR) service mapping method according to one embodiment.

FIG. 6 shows the frame structure of the OPUk portion of an ODUs frame when the agnostic CBR mapping method is applied. The OPUk OH includes a Payload Structure Identifier (PSI), a Cbyte field, and some reserved bytes (RES). The PSI identifies the structure type of the OPUk. The Cbyte carries the Cn (the number of customer signal bytes to be sent in the next ODUs frame). The reserved bytes are reserved for future standardized expansion.

Figure 7:
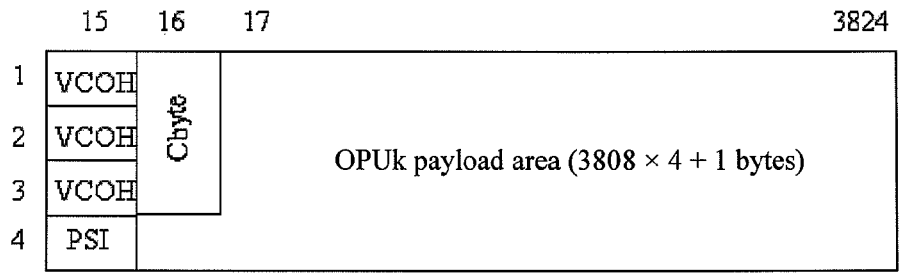
FIG. 7 shows the frame structure of the OPUk portion of an ODUs-Xv frame when using an agnostic Constant Bit Rate (CBR) service mapping method according to one embodiment.

FIG. 7 shows the structure of the OPUk portion after an ODUs-Xv frame is split when the agnostic CBR mapping method is applied. The OPUk OH includes a PSI, a Cbyte field, and several Virtual Concatenation (VCOH) bytes. The PSI identifies the structure type of virtual concatenation. The Cbyte field carries the Cn (the number of customer signal bytes to be sent in the next ODUs-Xv frame). The VCOH bytes indicate the use of virtual concatenation.

The bit padding method used for mapping can eliminate the clock jitter caused by padding and improve the quality of the clocks restored at the receiving end.

It is necessary to pad a fixed number of bits or bytes in an ODUs or ODUs-Xv frame in the bit padding method and the byte padding method. A certain number of justification bites or bytes must be reserved, similar to the Positive Justification Byte (PJO) or Negative Justification Byte (NJO) defined in ITU-T Recommendation G.709, so as to absorb the asynchronous frequency offset between ODU1/ODU2/ODU3 signals and ODUs/ODUs-4v/ODUs-16v frame signals.

According to various embodiments, OPUk and OPUk-Xv overheads are added after the mapping is completed.

A PSI and an OH specified for mapping are added to each of the ODUs or ODUs-Xv frames after the mapping. For an ODUs-Xv frame, VCOHs are also be added. For a simplified ODUs frame, a fixed padding field is added to replace the unused overhead bytes.

In act 104, the ODUs-Xv frames are divided into multiple groups of parallel ODUs frames, and then ODUk OH bytes are added to the ODUs frames divided from the ODUs-Xv frames whereas OTUk OH bytes are added to the ODUs frames that carry OTU1 signals so as to form complete ODUs frame signals.

The ODUs-Xv frames are divided according to the virtual concatenation rules previously mentioned into multiple groups of parallel ODUs frame signals. The ODUs frames that carry OTU1 signals are not divided. For example, the ODUs frames that carry OTU1 signals are not divided but each channel of ODUs-4v frames carrying OTU2 signals is split into 4 channels of parallel ODUs frame signals whereas each channel of ODUs-16v frames carrying OTU3 signals is split into 16 channels of parallel ODUs frame signals. The 4 channels of ODUs frame signals are organized into a group to carry complete OTU2 signals. The 16 channels of ODUs frame signals are organized into a group to carry complete OTU3 signals.

The added OH bytes include FAS, OTUk OH (excluding FEC) and ODUk OH bytes. For a simplified ODUs frame, a fixed padding field is also added to replace the unused OTUk OH (excluding FEC) and the unused ODUk OH. Ultimately, the signals are scrambled to form complete ODUs frame signals.

In act 105, the synchronous cross-connect matrix performs synchronous cross-connect switching for the complete ODUs frame signals.

The synchronous cross-connect matrix may assume one of multiple forms. For example, to improve the switching capacity of the entire OTN system, the synchronous cross-connect matrix may be an N×N CLOS cross-connect network, such as a common 3-layer CLOS cross-connect network or a bit slice cross-connect network or other similar ones.

For each group of parallel ODUs frame signals split from ODUs-Xv frame signals, the same switching path is applied during synchronous cross-connect switching. Bound switching is performed for the groups of parallel ODUs frame signals.

In act 106, the ODUs frame signals obtained after the switching by the synchronous cross-connect matrix are interpreted. The groups of parallel ODUs frames after the bound switching are assembled into ODUs-Xv frames.

If scrambling is applied in act 104, then the ODUs frame signals are descrambled before they are interpreted.

The act for interpreting the ODUs frame signals further includes interpreting the FAS OH, OTUk OH, ODUk OH and OPUk OH of each ODUs frame, and detecting the errors of ODUs frames. For the simplified ODUs structure, the fixed padding portion is omitted. For a group of parallel ODUs frame signals after the bound switching, first all the parallel ODUs frames in the group are aligned according to the frame alignment signal in the FAS OH and then are assembled into ODUs-Xv frames according to the VCOHs in the OPUk OH.

In act 107, the ODUs frames that do not belong to any group after the interpretation and the ODUs-Xv frames after the assembly are de-mapped to restore the received OTU signals previously mentioned.

The demapping refers to demapping the frames using the bit padding, byte padding, or agnostic CBR mapping method as indicated by the PSI to restore the received OTU signals and then sending the OTU signals.

According to various embodiments, a 2.5 Gb/s bit rate is used for switching ODUs frames. The bit rate level of ODUs frames may be chosen according to the actual backplane bit rate maturity. For example, when the received OTU signals include multiple channels of OTU1 signals, a 5 Gb/s or 10 Gb/s bit rate may be set for the ODUs frames and then the bit rate level of the ODUs frames is higher than the bit rate level of the OTU1 signals and thus the bit slice method may be adopted to map the received OTU1 signals into ODUs frames for cross-connect switching.

Figure 8:
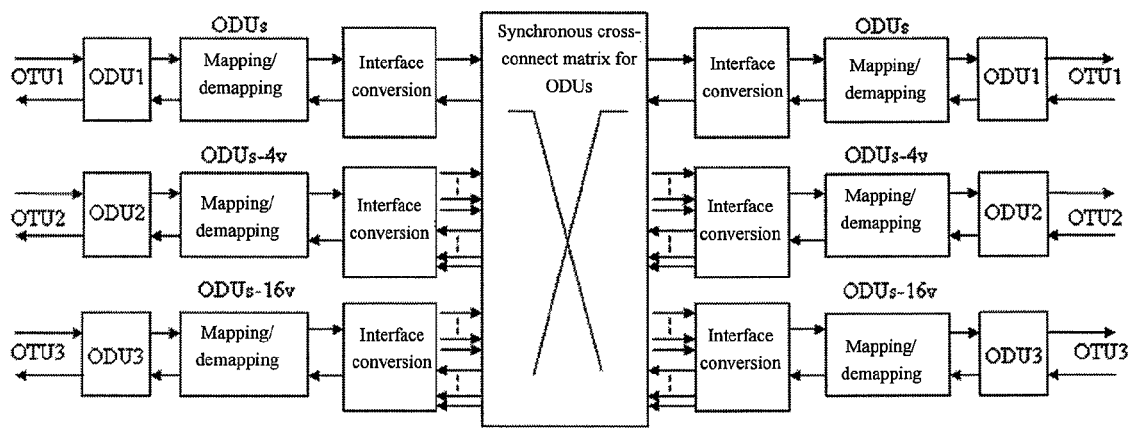
FIG. 8 shows the principles of synchronous cross-connect performed after OTU signals are demapped into ODU signals according to the one embodiment.

As shown in FIG. 8, in the method for synchronous cross-connect switching in OTN, the outer encapsulation of the received OTU signals may be removed to obtain ODU signals. The bit rate adaptation is performed for the ODU signals to map the ODU signals into the preset ODUs or ODUs-Xv frames. Accordingly, the ODUs or ODUs-Xv frames after synchronous cross-connect switching are demapped into the ODU signals and then outer encapsulation is performed to form the OTU signals. The ODU signals are mapped into ODUs or ODUs-Xv frames and a relationship may apply during the demapping of these ODUs or ODUs-Xv frames: ODU1 (2.498775126 Gb/s). . . . >ODUs; ODU2 (10.037273924 Gb/s). . . . >ODUs-4; ODU3 (40.319218983 Gb/s). . . . >ODUs-16v. For the ODUs frames that meet the carrying requirements, the bit rate is greater than or equal to 3824×40.319218983/(16×3808)=2.5305392 Gb/s. Therefore, 2.5305392 GHz may be used as the reference frequency for synchronous cross-connect switching. The reference frequency offset is allowed to be ±20 ppm or a smaller range. When only ODU1 and ODU2 signals need to be switched in the system or ODU1/ODU2/ODU1e/ODU2e signals need to be switched, the reference frequency of the ODUs frame signals may slightly deviate from the calculated value.

According one embodiment, OTU signals are mapped into the preset ODUs or ODUs-Xv frames, which are then switched using a synchronous cross-connect matrix to complete synchronous hybrid cross-connect switching of OTN signals at various bit rate levels, so as to improve the compatibility of the switching technology and reduce the development cost of chips. The ODUs frames may use an appropriate bit rate to effectively lower the requirements on logical resources. For example, a 2.5 GHz bit rate level can reduce the consumed logical resources and effectively save power consumption and cost. The N×N CLOS network or bit slice cross-connect network used for synchronous cross-connect switching can expand the switching capacity of the system, solve the capacity limitation that exists with asynchronous cross-connect switching, maximally improve the switching capacity of the system, and effectively bring into play the advantages of large-granularity cross-connect switching in OTN. As ODUs frames are compatible with OTN frames, the development workload of cross-connect chips is reduced and the system implementation is quicker. With the use of the agnostic CBR mapping method during asynchronous mapping, the mapping paths of various ODUk signals are unified. This improves the reuse of chip codes and reduces the cost of chip research and development.

Figure 9:
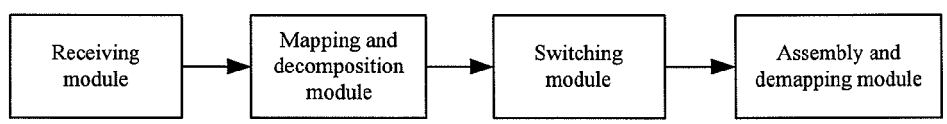
FIG. 9 shows a schematic structure of the apparatus for synchronous cross-connect in optical transport networks according to one embodiment.

As shown in FIG. 9, the apparatus for synchronous cross-connect switching in optical transport networks according to one embodiment includes: a receiving module, which receives Optical Transport Unit (OTU) signals in an Optical Transport Network (OTN); a mapping and dividing module, which maps the OTU signals received by the receiving module into ODUs or ODUs-Xv frames, and divides the ODUs-Xv frames into multiple groups of parallel ODUs frames; a switching module, which performs synchronous cross-connect switching for the ODUs frames obtained by the mapping and dividing module using a synchronous cross-connect matrix; and an assembly and demapping module, which assembles the groups of parallel ODUs frames obtained by the switching module into ODUs-Xv frames, and demaps the ODUs-Xv frames that are obtained after the assembly and the ODUs frames that do not belong to any group among the ODUs frames obtained by the switching module into OTU signals.

The mapping and dividing module may include the following units: a decapsulation unit, which removes the outer encapsulation of the OTU signals received by the receiving module to obtain ODU signals; a mapping unit, which maps the ODU signals obtained by the decapsulation unit into ODUs frames or ODUs-Xv frames; and a dividing unit, which divides the ODUs-Xv frames obtained by the mapping unit into multiple groups of parallel ODUs frames.

When the mapping and dividing module further includes the above-mentioned units, the assembly and demapping module may also further include the following units: an assembly unit, which assembles the groups of ODUs frames obtained by the switching module into the above-mentioned ODUs-Xv frames; a demapping unit, which demaps the ODUs-Xv frames obtained by the assembly unit and the ODUs frames that do not belong to any group among the ODUs frames obtained by the switching module into ODU signals; and an encapsulation unit, which performs an outer encapsulation to the ODU signals obtained by the demapping unit into OTU signals.

According to various embodiments, the ODUs frames carry OTU1 signals whereas the ODUs-Vx frames carry the other OTU signals.

According to the various embodiments, the mapping and dividing module maps OTU signals into the preset ODUs or ODUs-Xv frames and the switching module switches the ODUs or ODUs-Xv frames using a synchronous cross-connect matrix to complete synchronous hybrid cross-connect switching of OTN signals at various bit rate levels, so as to improve the compatibility of the switching technology and reduce the development cost of chips. The ODUs frames may use an appropriate bit rate to effectively lower the requirements on logical resources. The N×N CLOS network or bit slice cross-connect network used for synchronous cross-connect switching can further expand the switching capacity of the system, solve the capacity limitation that exists with asynchronous cross-connect switching, maximally improve the switching capacity of the system, and effectively bring into play the advantages of large-granularity cross-connect switching in OTN. As ODUs frames are compatible with OTN frames, the development workload of cross-connect chips is reduced and the system implementation is quicker. With the use of the agnostic CBR mapping method during asynchronous mapping, the mapping paths of various ODUk signals are unified. This improves the reuse of chip codes and reduces the cost of chip research and development.

In one embodiment, a network apparatus may be used in the optical transport network. The network apparatus includes a receiving unit, a mapping unit, a synchronous cross-connect matrix and a demapping unit. The receiving unit is configured to receive the OTU signals in the OTN, the mapping unit is configured to map the received OTU signals into interim switching units, the synchronous cross-connect matrix is configured to perform a synchronous cross-connect switching for the interim switching units, the demapping unit is configured to demap the interim switching units after the synchronous cross-connect switching to obtain the OTU signals.

The interim switching units can carry the OTU signals, and match the bit rates of the OTU signals. The bit rate of the interim switching units is slightly higher than that of the OTU signals so the interim switching units can carry the OTU signals. The interim switching units may include optical channel data unit switching frames (ODUs frames) and optical channel data unit switching virtual concatenation frames (ODUs-Xv), the ODUs frames carry the OTU1 signals and the ODUs-Xv carry the OTU signals having higher bit rates than the OTU1 signals, for example, OTU2 and/or OTU3 signals. The interim switching units may be obtained by preset.

The network apparatus may include a decapsulation unit configured to remove the outer encapsulation of the received OTU signals to obtain the optical channel data units, and a encapsulating unit to perform an outer encapsulation to the optical channel data unit obtained demapping the interim switching units.

Various embodiments of the present invention may be embodied via software. The programs of the software may be stored in an accessible storage media such as the hard disk or cache of a network apparatus in the optical transport network.

In one embodiment, computer readable media comprises computer program codes for performing synchronous cross-connect switching. The computer program codes may be logic encoded in one or more tangible media for execution. As used herein, logic encoded in one or more tangible media is defined as instructions that are executable by a programmed processor and that are provided on computer-readable storage media, memories, or a combination thereof.

While various embodiments of the present invention have been particularly shown and described with reference to preferred embodiments thereof, it will be understood by those skilled in the art that various changes in form and details may be made therein without departing from the spirit and scope of the invention as defined by the appended claims.

We claim:

1. A method for synchronous cross-connect switching in optical transport network, comprising:
    receiving optical channel transport unit (OTU) signals;
    mapping the OTU signals into interim switching units, wherein the interim switching units match bit rates of the received OTU signals; performing a synchronous cross-connect switching for the interim switching units; and
    demapping the interim switching units obtained after the synchronous cross-connect switching to obtain the OTU signals.

2. The method of claim 1, wherein mapping the OTU signals into the interim switching units includes mapping the OTU signals using an agnostic Constant Bit Rate, CBR, service mapping method, a byte padding method, or a bit padding method.

3. The method of claim 1, wherein the interim switching units adopt a frame structure of the ODU signals, or a frame structure obtained by making a fixed padding to some overheads of the ODU signals.

4. The method of claim 1, further comprising:
    removing outer encapsulations of the OTU signals to obtain optical channel data units;
    mapping the optical channel data units into the interim switching units;
    demapping the interim switching units obtained after the synchronous cross-connect switching to obtain the optical channel data units; and
    performing outer encapsulations to the optical channel data units to obtain the OTU signals.

5. The method of claim 1, wherein the bit rate of the interim switching units is higher than that of the OTU signals.

6. The method of claim 1, wherein the OTU signals are OUT1 and the interim switching units are optical channel data unit switching (ODUs) frames.

7. The method of claim 1, comprising:
    mapping the OTU signals into optical channel data unit switching virtual concatenation (ODUs-Xv) frames, wherein the ODUs-Xv frames are obtained by combining a plurality of ODUs frames according to a preset rule;
    dividing the ODUs-Xv frames into a plurality of groups having parallel ODUs frames;
    performing the synchronous cross-connect switching for the a plurality of groups having parallel ODUs frames;
    assembling the parallel ODUs frames, which belong to one group in the plurality of groups, into the ODUs-Xv frames; and demapping the ODUs-Xv frames to obtain the OTU signals.

8. The method of claim 7, wherein the ODUs-Xv frames are obtained by combining the a plurality of ODUs frames according to a fixed phase relation.

9. The method of claim 8, wherein the fixed phase relation comprises a position of the a plurality of ODUs frames, or a sending order of the a plurality of ODUs frames.

10. The method of claim 1, wherein the received OTU signals comprise first OTU signals and second OTU signals, the method comprises:
    mapping the first OTU signals into ODUs frames, and mapping the second OTU signals into ODUs-Xv frames, wherein the ODUs-Xv frames are obtained by combining a plurality of the ODUs frames according to a preset rule;
    dividing the ODUs-Xv frames into a plurality of groups having parallel ODUs according to the preset rule;
    performing the synchronous cross-connect switching for the a plurality of groups having parallel ODUs frames and the ODUs frames into which the first OTU signals are mapped;
    assembling the parallel ODUs frames, which belong to one group in the plurality of groups, into the ODUs-Xv frames; and
    demapping the ODUs-Xv frames and the ODUs frames into which the first OTU signals are mapped to obtain the OTU signals.

11. A network apparatus, comprising:
    a receiving unit that is configured to receive OTU signals;
    a mapping unit that is configured to map the OTU signals into interim switching units, wherein the interim switching units match bit rates of the OTU signals, and are configured to carry the OTU signals;
    a synchronous cross-connect matrix that is configured to perform a synchronous cross-connect matrix switching for the interim switching units; and
    a demapping unit that is configured to demap the interim switching units to obtain the OTU signals.

12. The network apparatus of claim 11, wherein the OTU signals are OTU1 signals.

13. The network apparatus of claim 12, wherein the interim switching units are ODUs frames.

14. The network apparatus of claim 11, wherein the OTU signals are OTU2 or OTU3, the interim switching units are ODUs-Xv frames, the ODUs-Xv frames are obtained by combining a plurality of ODUs frames according to a preset rule, the network apparatus further comprises:

a dividing unit that is configured to divide the ODUs-Xv frames into a plurality of groups having parallel ODUs frames; and an assembling unit that is configured to assemble the parallel ODUs frames, which belong to one group in the plurality of groups, into the ODUs-Xv frames.

15. A network apparatus, comprising:

a receiving module that is configured to receive first OTU signals and second OTU signals;

a mapping and dividing module that is configured to map the first OTU signals into ODUs frames and map the second OTU signals into ODUs-Xv frames, and divide the ODUs-Xv frames into a plurality of groups of parallel ODUs frames;

a switching module that is configured to perform a synchronous cross-connect switching for the ODUs frames and the a plurality of groups having parallel ODUs frames using a synchronous cross-connect matrix; and an assembly and demapping module that is configured to assemble the parallel ODUs frames, which belong to one group in the plurality of groups, into the ODUs-Xv frames, and demap the ODUs-Xv frames and the ODUs frames to obtain the OTU signals.

16. The network apparatus of claim 15, wherein the mapping and dividing module comprises:

a decapsulation unit that is configured to remove outer encapsulations of the first OTU signals and the second OTU signals to obtain first optical channel data units and second optical channel data units respectively;

a mapping unit that is configured to map the first optical channel data units into the ODUs frames and map the second optical channel data units into the ODUs-Xv frames;

a dividing unit that is configured to divide the ODUs-Xv frames into a plurality of groups having parallel ODUs frames;

wherein the assembly and demapping module comprises:

an assembly unit that is configured to assemble the parallel ODUs frames into the ODUs-Xv frames;

a demapping unit, configured to demap the ODUs-Xv frames and the ODUs frames to obtain the first optical channel units and the second optical channel units;

an encapsulation unit, configured to perform outer encapsulations to the first optical channel data units and the second optical channel data units to obtain the first OTU signals and the second OTU signals respectively.

17. The network apparatus of claim 15, wherein the first OTU signals are OTU1 and the second OTU signals are OTU2 or OTU3.

18. A non-transitory computer readable storage medium storing a computer program that includes instructions, the instructions causing a processor to: media, comprising logic encoded in the computer readable media, the logic when executed receive optical channel transport unit (OTU) signals;

map the OTU signals into interim switching units, wherein the interim switching units match bit rates of the received OTU signals;

perform a synchronous cross-connect switching for the interim switching units; and demap the interim switching units obtained after the synchronous cross-connect switching to obtain the OTU signals.

19. The non-transitory computer readable storage medium media of claim 18, further comprising instructions for causing the processor to:

map the OTU signals into optical channel data unit switching virtual concatenation (ODUs-Xv) frames, wherein the ODUs-Xv frames are obtained by combining a plurality of ODUs frames according to a preset rule;

divide the ODUs-Xv frames into a plurality of groups having parallel ODUs frames;

perform the synchronous cross-connect switching for the a plurality of groups having parallel ODUs frames;

assemble the parallel ODUs frames, which belong to one group in the plurality of groups, into the ODUs-Xv frames; and demap the ODUs-Xv frames to obtain the OTU signals.

20. The non-transitory computer readable storage medium media of claim 18, further comprising instructions for causing the processor to logic that is also operable to:

map the first OTU signals into ODUs frames, and map the second OTU signals into ODUs-Xv frames, wherein the ODUs-Xv frames are obtained by combining a plurality of the ODUs frames according to a preset rule;

divide the ODUs-Xv frames into a plurality of groups having parallel ODUs according to the preset rule;

perform the synchronous cross-connect switching for the a plurality of groups having parallel ODUs frames and the ODUs frames into which the first OTU signals are mapped;

assemble the parallel ODUs frames, which belong to one group in the plurality of groups, into the ODUs-Xv frames; and demap the ODUs-Xv frames and the ODUs frames into which the first OTU signals are mapped to obtain the OTU signals.

* * * * *

UNITED STATES PATENT AND TRADEMARK OFFICE
CERTIFICATE OF CORRECTION

PATENT NO. : 7,782,843 B2  Page 1 of 1
APPLICATION NO. : 12/209619
DATED : August 24, 2010
INVENTOR(S) : Shimin Zou et al.

It is certified that error appears in the above-identified patent and that said Letters Patent is hereby corrected as shown below:

In the Claims

In column 12, claim 20, line 32, after "the processor" delete "to logic that is also operable".

Signed and Sealed this

Twenty-sixth Day of October, 2010

David J. Kappos
*Director of the United States Patent and Trademark Office*